(12) United States Patent
Artmann et al.

(10) Patent No.: US 9,372,341 B2
(45) Date of Patent: Jun. 21, 2016

(54) COMB DRIVE INCLUDING A PIVOTABLE MIRROR ELEMENT

(71) Applicant: Robert Bosch GmbH, Stuttgart (DE)

(72) Inventors: Hans Artmann, Boeblingen-Dagersheim (DE); Jochen Reinmuth, Reutlingen (DE); Peter Sudy, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 29 days.

(21) Appl. No.: 14/565,034

(22) Filed: Dec. 9, 2014

(65) Prior Publication Data
US 2015/0160455 A1    Jun. 11, 2015

(30) Foreign Application Priority Data

Dec. 10, 2013  (DE) .......................... 10 2013 225 364

(51) Int. Cl.
*G02B 26/08*  (2006.01)

(52) U.S. Cl.
CPC ........ *G02B 26/0841* (2013.01); *G02B 26/0816* (2013.01)

(58) Field of Classification Search
CPC ........... G02B 26/0841; G02B 26/0816; G02B 6/357; B81B 2201/033; B81B 2201/045; B81B 2203/058; B81B 3/0035
USPC .............................. 359/199.2, 200.6; 310/309
See application file for complete search history.

(56) References Cited

U.S. PATENT DOCUMENTS

| | | | |
|---|---|---|---|
| 2005/0037531 A1* | 2/2005 | Kouma | ............... B81C 1/00626 438/48 |
| 2006/0119216 A1* | 6/2006 | Kouma | .............. G02B 26/0841 310/309 |

* cited by examiner

*Primary Examiner* — James Phan
(74) *Attorney, Agent, or Firm* — Norton Rose Fulbright US LLP

(57) ABSTRACT

A comb drive includes a pivotable mirror element, a first and a second comb electrode, the second comb electrode being movable along an offset direction relative to the first electrode from a minimum into a maximum offset position, the second electrode being connected to the mirror element via a lever arm pivotable about a pivot axis, the first and second comb electrodes being interlockingly engaged so that a first comb tooth of the first electrode and a second comb tooth of the second electrode are situated adjacent to one another along a projection direction extending perpendicularly to the offset direction, the first comb tooth and/or the second comb tooth being configured so that an average distance between the first comb tooth and the second comb tooth along the projection direction extending perpendicularly to the offset direction decreases when moving the second electrode from the minimum into the maximum offset position.

9 Claims, 5 Drawing Sheets

COMB DRIVE INCLUDING A PIVOTABLE MIRROR ELEMENT

RELATED APPLICATION INFORMATION

The present application claims priority to and the benefit of German patent application no. 10 2013 225 364.8, which was filed in Germany on Dec. 10, 2013, the disclosure of which is incorporated herein by reference.

FIELD OF THE INVENTION

The present invention relates to a comb drive including a pivotable mirror element.

BACKGROUND INFORMATION

Such comb drives are believed to be understood from micro-mirrors, which are used increasingly in projectors, scanners or the like. In contrast to many types of drives, such as magnetic and piezoelectric drives, an electrostatic drive concept has the advantage that a mirror deflection may be achieved simply by applying a voltage (in the static case, essentially without loss of energy). In the case of small deflections, a nearly linear drive characteristic allows for a particularly simple controlling of the micro-mirror.

The disadvantage of the electrostatic drive concept is that only very little force may be applied in an area predefined for the comb drive, the predefined area usually being limited by the desired space-saving configuration of the micro-mirror. If, for example, multiple mirrors are to be combined as an array, it is beneficial to position the drive under the mirrors, in order thereby to be able to flexibly combine the individual mirrors with one another. The result of such an arrangement is that the installation space available for the comb drive is defined by the size of the mirror surface.

SUMMARY OF THE INVENTION

It is therefore an object of the present invention to provide a comb drive including a pivotable mirror element, the comb drive being able to exert what may be a large force for pivoting the mirror element, in spite of the limited installation space below the mirror. In addition, it would be desirable in this arrangement for a linear drive characteristic to allow for a particularly simple controlling of the comb drive.

The object of the present invention may be achieved by a comb drive which includes a pivotable mirror element, the comb drive including a first comb electrode and a second comb electrode. According to the present invention, it is provided that the second comb electrode is movable from a minimum offset position into a maximum offset position along an offset direction relative to the first comb electrode. In order to pivot the mirror element, the second comb electrode is connected to the mirror element via a lever arm pivotable about a pivot axis. This allows an offset of the second comb electrode relative to the first comb electrode to be translated into a swivel movement of the mirror element.

According to the present invention, it is provided that the first comb electrode and the second comb electrode are interlockingly engaged in such a way that a first comb tooth of the first comb electrode and a second comb tooth of the second comb electrode are situated adjacent to one another along a projection direction extending perpendicularly to the offset direction.

In particular, the first and the second comb electrode are situated in such a way that the overlap of first and second comb tooth along the projection direction changes in the transition from the minimum offset position into the maximum offset position. It is also provided according to the present invention that the first comb tooth and/or the second comb tooth is/are configured in such a way that an average distance between the first comb tooth and the second comb tooth along the projection direction, i.e., perpendicularly to the offset direction, decreases as the second comb electrode is moved from the minimum offset position into the maximum offset position. An average distance is understood to mean the averaged distance between first and second comb tooth (along the offset direction) over the extension of the first and second comb tooth (along the projection direction).

The advantage of the present invention over the related art is that as a result of the decrease in the average distance, a loss of overlap occurring as the second comb electrode is moved from the minimum offset position into the maximum offset position may be compensated for. Such a loss of overlap is the direct result of a tilting of the second comb electrode, caused by the pivotal movement, which the second comb electrode executes due to its connection with the lever arm. The loss of overlap results in a loss of surface area, which is available for building capacitance between the first and the second comb electrode. As a result, a voltage applied between the first and the second comb electrode is not able to exert the force required or desired. This applies all the more so with increasing offset, i.e., increasing deflection of the mirror element.

Thus, in order to implement a further or additional deflection, the voltage would have to be further increased. The consequences would be a non-linear drive characteristic and an increased energy requirement, in particular for large deflections. The present invention counteracts these problems by adapting the geometric shape of the first comb tooth and/or the second comb tooth in such a way that the loss of overlap caused by the movement (of the second comb electrode) from the minimum offset position into the maximum offset position is compensated for.

The geometric shape of the first and/or the second comb electrode may be adapted to the loss of overlap caused by the offset or by the deflection. By decreasing the average distance during movement, the capacitance between the first and the second comb tooth may be advantageously manipulated in such a way that a reduction in capacitance caused by the loss of overlap may again be compensated for. The positive outcome of the configuration of the first and/or the second comb tooth is, for example, a linear drive characteristic, with which a simple controlling of the comb drive for pivoting the mirror element may be implemented. In addition, the energy requirement in the comb drives according to the present invention is reduced as compared to those drives which compensate for the loss of overlap by increasing the voltage. The comb drive may include, in addition to the first comb electrode, a further first comb electrode, the second comb electrode being situated between the first and the further first comb electrode.

Advantageous embodiments and refinements of the present invention are derivable from the disclosures herein, and from the description with reference to the drawings.

In another specific embodiment, it is provided that the second comb tooth tapers in the offset direction and/or the first comb tooth tapers in a direction counter to the offset direction. In the maximum offset position, i.e., during maximum deflection, the forces in the electric field in terms of area are approximately equal, as a result of which forces are at work in one tip of the second comb tooth which are less than in the vicinity of a suspension point, the second comb tooth extending essentially from the suspension point to the tip along the offset direction. It has proven advantageous in this case that as result of the taper, more comb teeth may be situated adjacent to one another along the projection direction. As a result, the force provided by the comb drive is advantageously increased. It is conceivable in this case that edges of the first and/or of the second comb tooth extend at least partially in a curve or in a straight line.

In another specific embodiment, it is provided that
the first comb tooth along a direction running counter to the offset direction and/or
the second comb tooth along the offset direction, has an average taper of more than 8%. An average taper is understood to mean the taper averaged over the extension of the first and the second comb tooth (along the offset direction).

In another specific embodiment, it is provided
that along a direction predefined by a general path of the lever arm, the distance between pivot axis and first and/or second comb electrode is greater than double an extension of the first comb electrode and/or
that the distance between pivot axis and first and/or second comb electrode is greater than double an extension of the second comb electrode along the direction predefined by the general path of the lever arm. In particular, the second comb electrode is not situated over the entire length of the lever arm, but rather only in a lower area of the lever arm. The lower area advantageously contributes significantly more to the overall creation of force than an upper area of the lever arm. For a shortened second comb electrode, a comb drive may be implemented during manufacturing having what may be a small distance between the first and the second comb tooth, as a result of which the capacitance and, consequently, the electrostatic force potentially provided may be advantageously increased. In addition, more first and second comb teeth may be implemented. In this way, the available electrostatic force may be advantageously increased. In shortened second comb electrodes, the loss of overlap caused by the movement of the second comb electrode from the minimum offset position into the maximum offset position, is increased. Advantageously, as a result of the configuration of the first and the second comb tooth, the loss of overlap is compensated for even for shortened comb electrodes.

In another specific embodiment, it is provided that the first comb tooth and/or the second comb tooth are configured in such a way that the average distance between the first comb tooth and the second comb tooth decreases by more than 5% as the second comb electrode moves from the minimum offset position (direction) into the maximum offset position. In such a case, it is conceivable that the first and the second comb tooth are configured complementary to one another.

In another specific embodiment, it is provided
that a first aspect ratio of a side of the first comb electrode extending in parallel to the general path of the lever arm to a side of the lever arm extending in parallel to the general path of the lever arm is greater than four times a maximum deflection angle in radians squared, and/or
that a second aspect ratio of a second side of the second comb electrode extending in parallel to the general path of the lever arm to the side of the lever arm extending in parallel to the general path of the lever arm is greater than four times the maximum deflection angle in radians squared.

In another specific embodiment, it is provided that a torsion spring is situated along the pivot axis. The torsion spring allows a pivot axis to be implemented, which advantageously ensures that the second comb electrode may be returned again from the maximum offset position into the minimal offset position. In particular, no additional electrostatic force is necessary for returning.

In another specific embodiment, it is provided that a voltage between the first comb electrode and the second comb electrode is adjustable. With the applied voltage, it is possible to control the electrostatic force between the first and the second comb tooth. As a result of this control, the offset between the first and the second comb tooth and, ultimately, the degree of pivot of the mirror element may be defined in a particularly simple manner.

An additional subject matter of the present invention is a micro-mirror including a comb drive having a pivotable mirror element as was described above. In the various figures, identical parts are always provided with the same reference numerals and, in each case, are therefore generally also named or mentioned only once.

DETAILED DESCRIPTION

Figure 1:
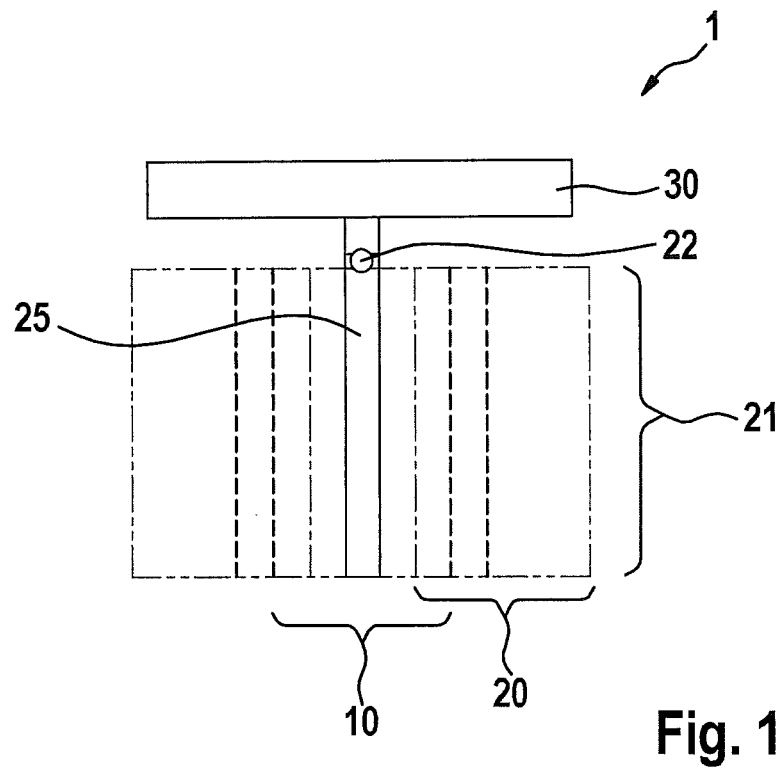
FIG. 1 shows a comb drive having a non-deflected mirror according to the related art.

FIG. 1 depicts a comb drive 1 having a pivotable mirror element 30 in a specific embodiment known from the related art, the mirror element 30 being situated in a zero position, i.e., mirror element 30 is not deflected. Comb drive 1 may include a fixed first comb electrode 10 and a second comb electrode 20 movable relative to first comb electrode 10. In particular, first comb electrode 10 and second comb electrode 20 are interlockingly engaged in such a way that an overlap of first comb electrode 10 and second comb electrode 20 along a direction extending in parallel to pivot axis 22 changes when second comb electrode 20 is moved relative to first comb electrode 10 along an offset direction. Typically, second comb electrode 20 is connected to mirror element 30 via a lever arm 25 pivotable about a pivot axis 22, second comb electrode 20 extending essentially along the entire portion of lever arm 25, which extends from pivot axis 22 on the side facing away from mirror element 25. As a result of the connection via lever arm 25, mirror element 30 is pivoted when second comb electrode 20 is moved relative to first comb electrode 10. To control the overlap of first and second comb electrode along a projection direction extending perpendicularly to the offset direction and, therefore, to control the movement of second comb electrode 20 relative to first comb electrode 10, a voltage may be applied between first comb electrode 10 and second comb electrode 20. In addition, comb drive 1 includes an additional first comb electrode 10, which is situated along the offset direction opposite first comb electrode 10.

Figure 2:
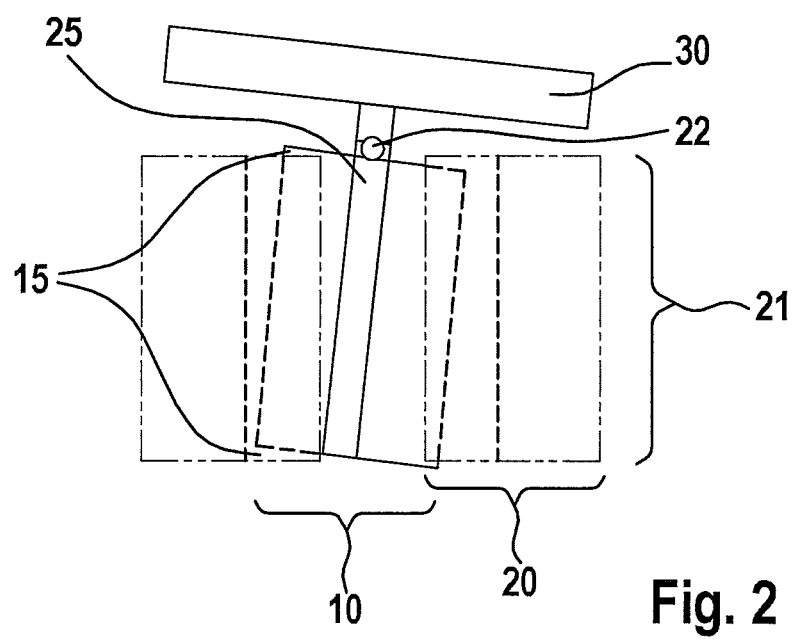
FIG. 2 shows a comb drive having a deflected mirror according to the related art.
Figure 3:
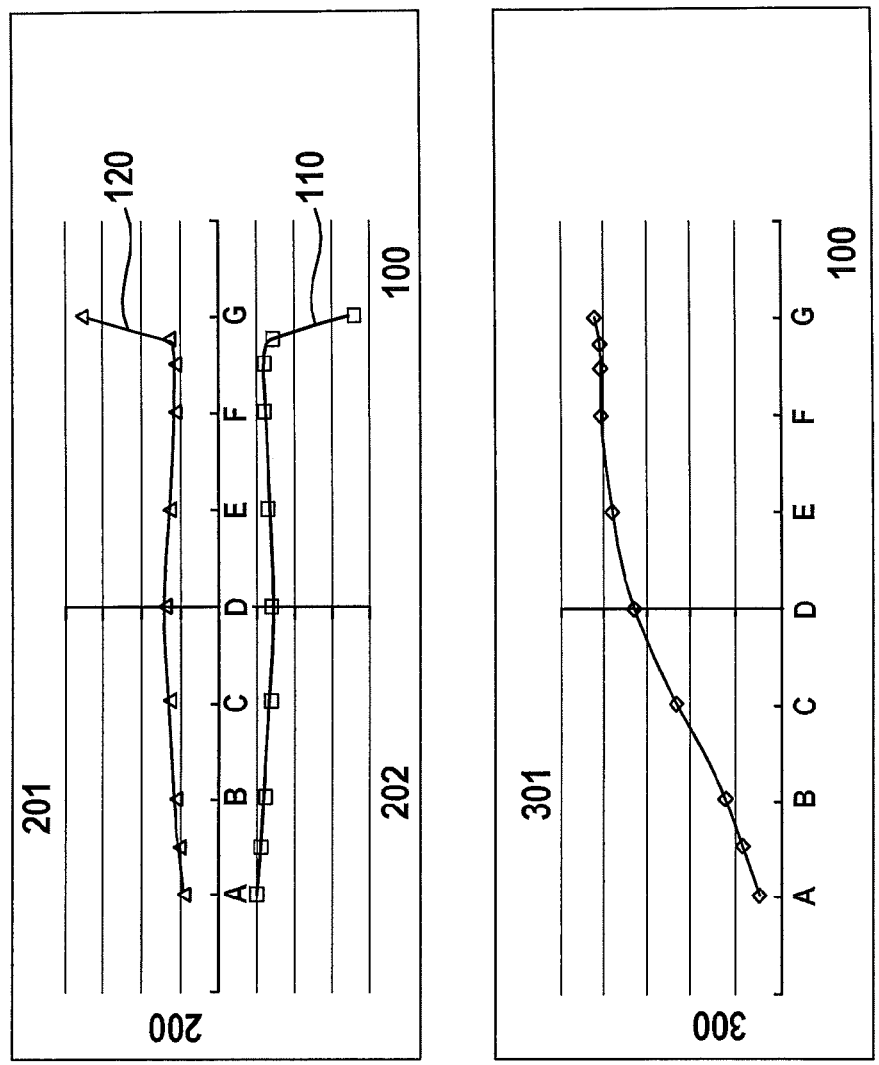
FIG. 3 shows the force curve and capacitance curve for a comb drive having a pivotable mirror element as a function of an inclination of a second comb electrode relative to the first comb electrode caused by the deflection.
Figure 3:
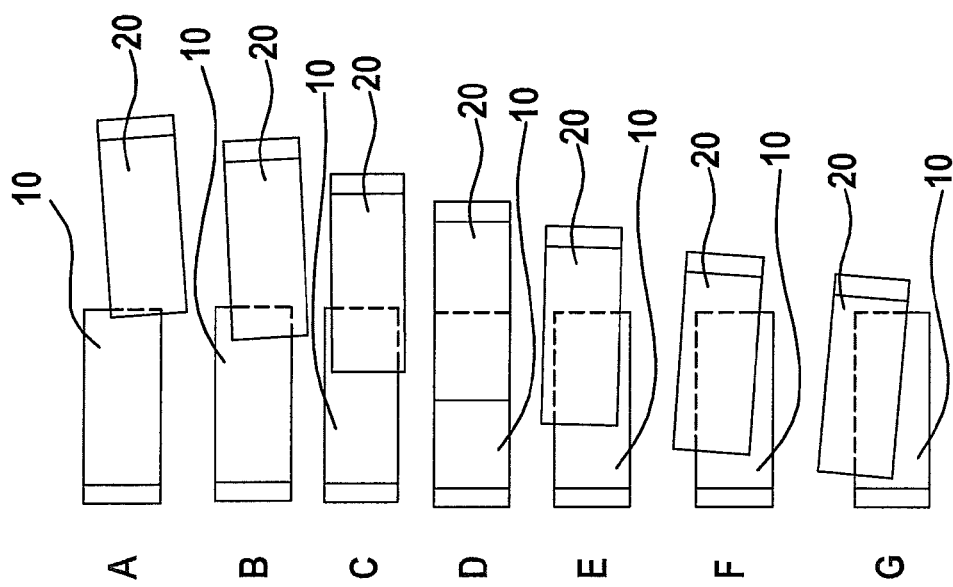

FIG. 2 depicts a comb drive 1 having a pivotable mirror element 30 in the specific embodiment known from the related art having a deflected mirror element 30. Although it is provided that first comb electrode 10 and second comb electrode 20 are merged into one another along the offset direction, a rotation of second comb electrode 20 relative to first comb electrode 10 is initiated by the specifically summoned offset movement of second comb electrode 20 (relative to the first comb electrode)—caused by the linking of second comb electrode 20 to pivot axis 22 via lever arm 25. As a result of this rotation, portions 15 of second comb electrode 20 slip from the area overlapping with first comb electrode 10, and portions 15 of the first comb electrode slip from the area overlapping with the second comb electrode. The resulting consequences are depicted in FIG. 3. Depicted on the left side of FIG. 3 are seven different deflection positions, which differ from one another by tilt angles A=−6°, B=−4°, C=−2°, D=0°, E=2°, F=4° and G=6° of second comb electrode 20 relative to first comb electrode 10. Plotted in μN above on the right side of FIG. 3 are electrostatic forces 201 calculated for each deflection, a decrease of electrostatic force with increasing deflection being observable in both a first force curve 110 and in a second force curve. Depicted below on the right side of FIG. 3 is a capacitance curve 301 in pF as a function of tilt angle 100. In particular, it may be observed that electrostatic force 201 does not increase or decrease linearly with the voltage applied between first and second comb electrode 10 and 20. In other words, for a large deflection, a voltage is required for another or additional deflection, which is higher than would be necessary without loss of overlap. The increase of G=6° is due to the fact that second comb electrode 20 almost touches first comb electrode 10. Such a strong non-linear effect may be avoided by a corresponding distance between first and second comb electrodes 10 and 20.

Figure 4:
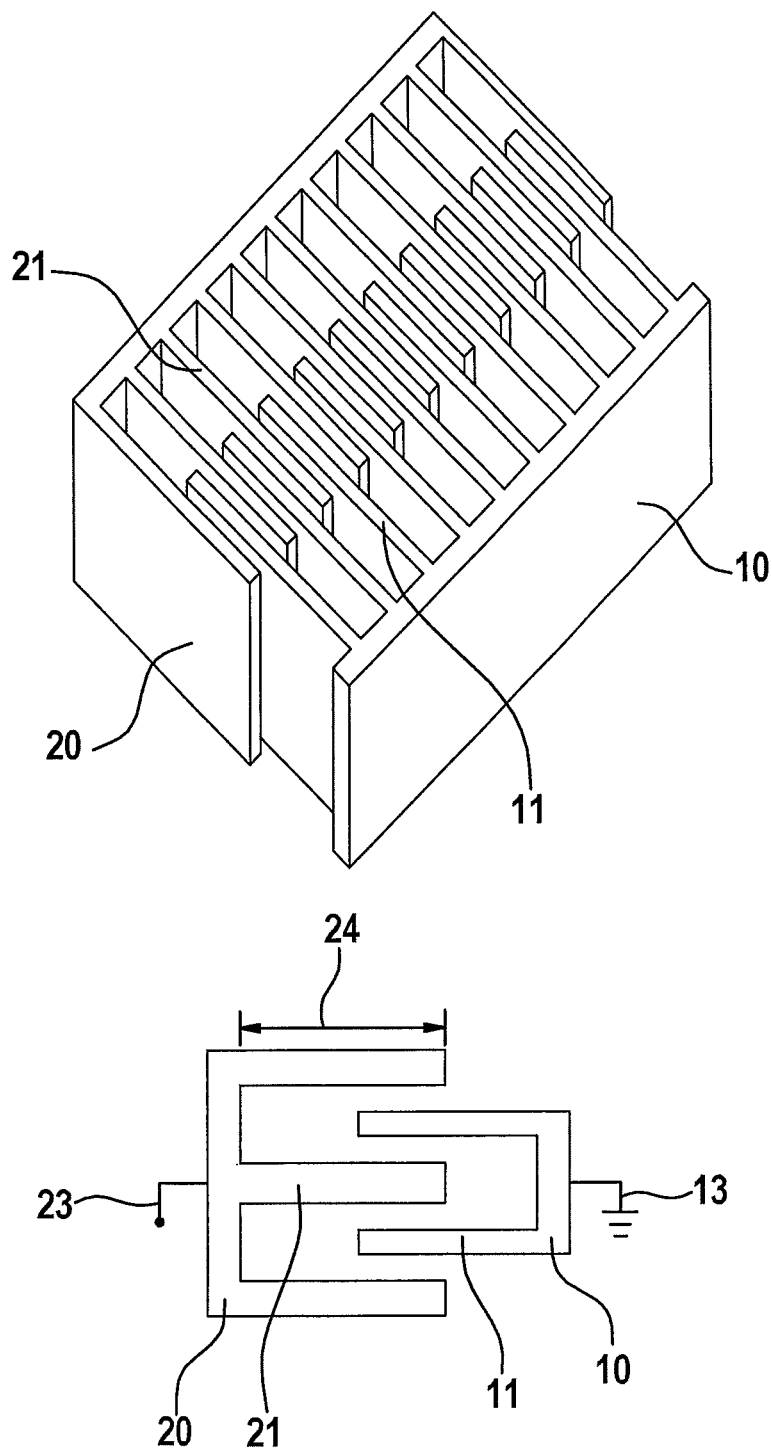
FIG. 4 shows a perspective representation and a side view of a comb drive.

FIG. 4 shows a perspective representation and a side view of a comb drive 1. In this case, first comb electrode 10 includes first comb teeth 11 along a first extension direction, and second comb electrode 20 includes second comb teeth 21 along a second extension direction. Typically, first comb electrode 10 and second comb electrode 20 are situated in such a way that first and second comb electrodes 10 and 20 are interlockingly engaged. First comb teeth 11 and second comb teeth 21 may be situated in such a way that upon interlocking engagement of first and second comb electrodes 10 and 20, first and second comb teeth 11 and 21 are situated alternately adjacent to one another along a projection direction extending essentially perpendicularly to the offset direction. In particular, first comb teeth 11 have a first extension length along the first extension direction, and the second comb teeth have a second extension length along the second extension direction. In particular, the first extension length and the second extension length determine how far first comb electrode 10 may be inserted into second comb electrode 20.

Figure 5:
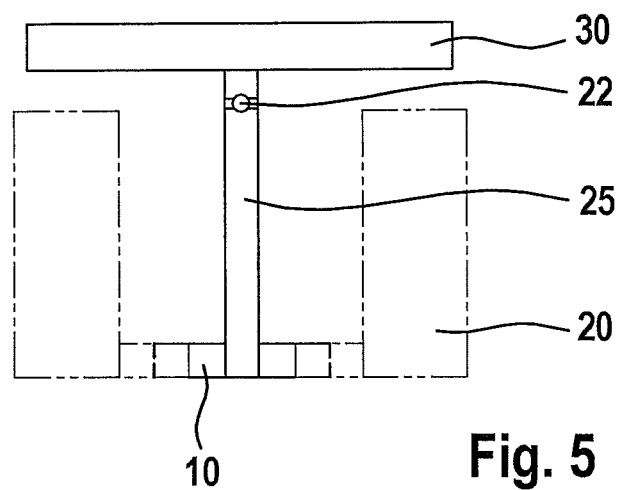
FIG. 5 shows a comb drive having a deflected mirror according to a first exemplary specific embodiment of the present invention.

FIG. 5 depicts a comb drive 1 having a pivotable mirror element 30 according to a first exemplary specific embodiment of the present invention, pivotable mirror element 30 being situated in the zero position. In this case, it is provided that the distance between pivot axis 22 and second comb electrode 20 along a direction predefined by the general path of lever arm 25 is greater than the extension of second comb electrode 20 along the same direction, which may be greater than double the extension of second comb electrode 20 along the same direction. In particular, second comb electrode 20 is situated at the end of lever arm 25. Compared to the arrangement depicted in FIG. 1, this arrangement has the advantage that it is possible in a manufacturing method of the first and second comb electrode to implement what may be small distances between two first and two second comb teeth 11 or 21. The reduction of these distances means that the electrostatic forces may be increased. In addition, given the same installation space requirements, more comb teeth may be implemented in comb drive 1, in particular in second comb electrode 20, as a result of which the force exertable by comb drive 1 is further increased.

Figure 6:
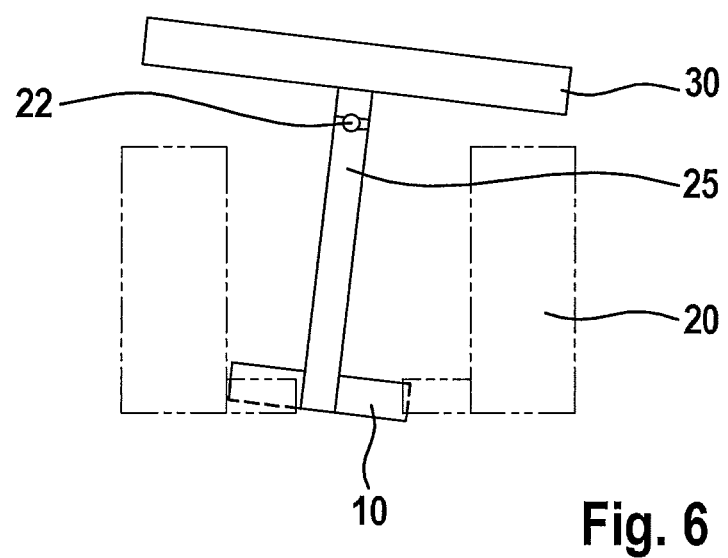
FIG. 6 shows a comb drive having a non-deflected mirror according to a first exemplary specific embodiment of the present invention.

FIG. 6 depicts comb drive 1 including a pivotable mirror element 30 according to the first exemplary specific embodiment having a deflected mirror element 30 of the present invention. By reducing the extension of second comb electrode 20 along a direction predefined essentially by the general path of lever arm 25, a reduction of the overlap during tilting of second comb electrode 20 relative to first comb electrode 10 becomes more clearly noticeable than in the case of an arrangement as depicted in FIGS. 1 and 2.

Figure 7:
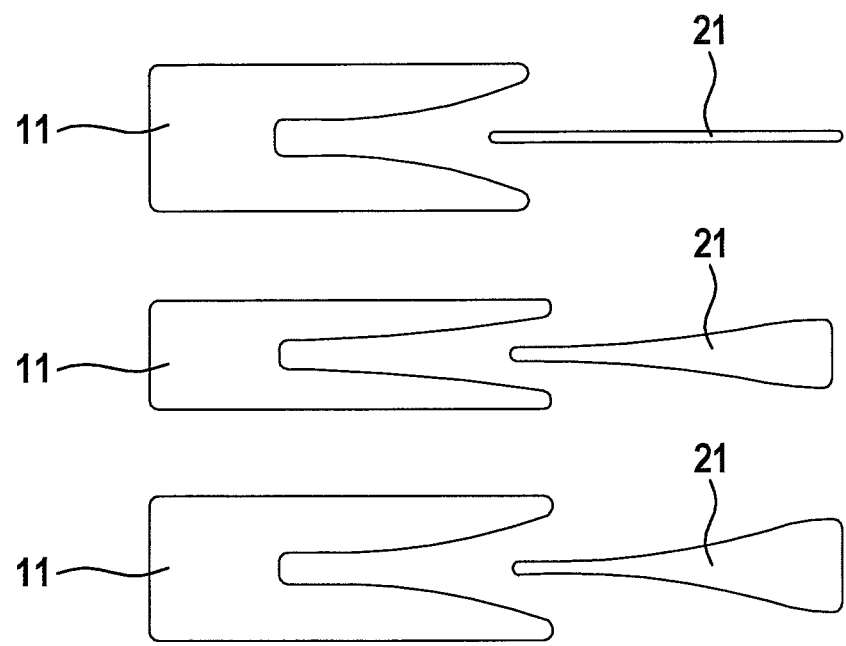
FIG. 7 shows tapering second comb teeth having corresponding first comb teeth according to a second, a third and a fourth exemplary specific embodiment of the present invention.

FIG. 7 depicts first and second comb teeth 11 and 21 according to a second, third and a fourth exemplary specific embodiment. In all of the specific embodiments depicted in FIG. 7, first comb electrode 10 is illustrated on the left in each case, and second comb electrode 20 on the right. In the second specific embodiment (above), second comb tooth 21 of second comb electrode 20 does not taper, whereas first comb electrode 10 is configured in such a way that the distance between two comb teeth 11 is increased along a direction extending counter to the offset direction. If second comb tooth 21 is moved along the offset direction and, therefore, in the direction of second comb teeth 21, the average distance between first and, respectively, second comb tooth 11 and 21 will be reduced. The reduced distance would mean that the electrostatic force increases, as compared to the situation in which the average distance between first and second comb tooth 11 and 21 does not change. In the third specific embodiment (middle figure), it is provided that second comb tooth 21 tapers in the direction of first comb electrode 10, in particular along the offset direction. In this case, it is provided according to the third specific embodiment that second comb tooth 21 is shaped like an isosceles triangle. In the fourth specific embodiment (below), the tapering of second comb tooth 21 is formed in such a way that the side surfaces or edges of second comb tooth 21 are curved. The curved shape allows the increase of electrostatic force to be adjusted in such a way that a linear drive characteristic may be implemented.

What is claimed is:

1. A comb drive, comprising:
   a pivotable mirror element;
   a first comb electrode;
   a second comb electrode, the second comb electrode being movable along an offset direction relative to the first comb electrode from a minimum offset position into a maximum offset position, the second comb electrode being connected to the mirror element via a lever arm pivotable about a pivot axis, the first comb electrode and the second comb electrode being interlockingly engaged so that a first comb tooth of the first comb electrode and a second comb tooth of the second comb electrode are situated adjacent to one another along a projection direction extending perpendicularly to the offset direction;
   wherein the first comb tooth and/or the second comb tooth are configured so that an average distance between the first comb tooth and the second comb tooth along the projection direction extending perpendicularly to the offset direction is reduced when moving the second comb electrode from the minimum offset position into the maximum offset position.

2. The comb drive of claim 1, wherein the second comb tooth tapers in the offset direction and/or the first comb tooth tapers in a direction counter to the offset direction.

3. The comb drive of claim 2, wherein the first comb tooth along a direction extending counter to the offset direction, and/or the second comb tooth along the offset direction, has an average taper of more than 8%.

4. The comb drive of claim 1, wherein the distance between pivot axis and first comb electrode and/or second comb electrode is greater than double an extension of the first comb electrode along a direction predefined by a general path of the lever arm, and/or wherein the distance between pivot axis and first comb electrode and/or second comb electrode is greater than double an extension of the second comb electrode along a direction predefined by the general path of the lever arm.

5. The comb drive of claim 1, wherein the first comb tooth and/or the second comb tooth is configured so that the average distance between the first comb tooth and the second comb tooth decreases by more than 5% when moving the second comb electrode from the minimum offset position into the maximum offset position.

6. The comb drive of claim 1, wherein a first aspect ratio of a side of the first comb electrode extending in parallel to the general path of the lever arm to a side of the lever arm extending in parallel to the general path of the lever arm is greater than four times a maximum deflection angle in radians squared, and/or wherein a second aspect ratio of a second side of the second comb electrode extending in parallel to the general path of the lever arm to the side of the lever arm extending in parallel to the general path of the lever arm is greater than four times the maximum deflection angle in radians squared.

7. The comb drive of claim 1, wherein a torsion spring is situated along the pivot axis.

8. The comb drive of claim 1, wherein a voltage between the first comb electrode and the second comb electrode is adjustable.

9. A micro-mirror, comprising:
    a comb drive having a pivotable mirror element, including:
        a first comb electrode;
        a second comb electrode, the second comb electrode being movable along an offset direction relative to the first comb electrode from a minimum offset position into a maximum offset position, the second comb electrode being connected to the mirror element via a lever arm pivotable about a pivot axis, the first comb electrode and the second comb electrode being interlockingly engaged so that a first comb tooth of the first comb electrode and a second comb tooth of the second comb electrode are situated adjacent to one another along a projection direction extending perpendicularly to the offset direction;
    wherein the first comb tooth and/or the second comb tooth are configured so that an average distance between the first comb tooth and the second comb tooth along the projection direction extending perpendicularly to the offset direction is reduced when moving the second comb electrode from the minimum offset position into the maximum offset position.

* * * * *